H. G. BALLOU.
TIRE CLEANING APPARATUS.
APPLICATION FILED DEC. 29, 1919.

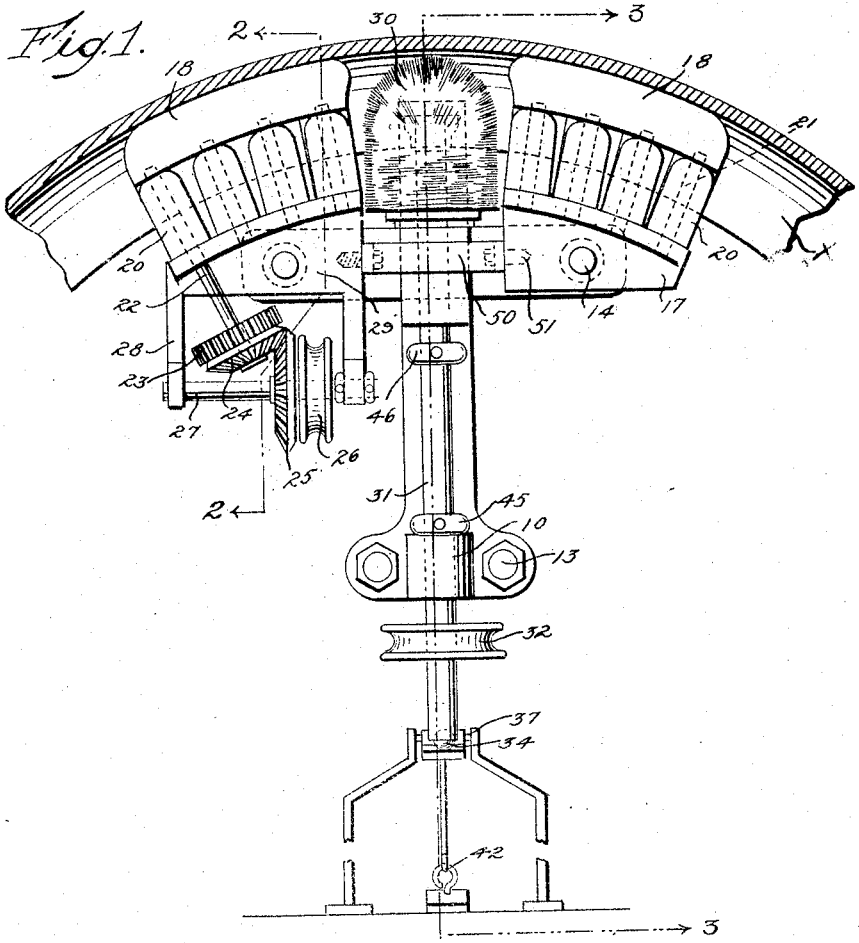
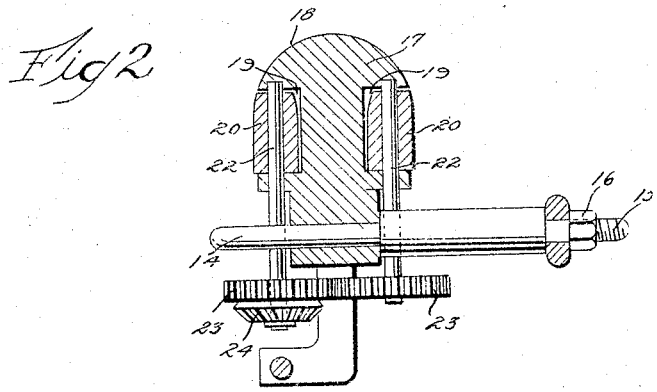

1,365,581.

Patented Jan. 11, 1921.
2 SHEETS—SHEET 2.

WITNESSES

INVENTOR
H. G. Ballou.
BY
ATTORNEYS

UNITED STATES PATENT OFFICE.

HAROLD G. BALLOU, OF LOS ANGELES, CALIFORNIA.

TIRE-CLEANING APPARATUS.

1,365,581.

Specification of Letters Patent.   Patented Jan. 11, 1921.

Application filed December 29, 1919. Serial No. 348,204.

*To all whom it may concern:*

Be it known that I, HAROLD G. BALLOU, a citizen of the United States, and a resident of Los Angeles, in the county of Los Angeles and State of California, have invented a new and Improved Tire-Cleaning Apparatus, of which the following is a full, clear, and exact description.

The present invention relates to new and useful improvements in machines for operating on tires, and it pertains more particularly to a machine for cleaning both the interior and exterior surfaces of casings of tires of the pneumatic type. The inner surfaces of casings for pneumatic tires are coated with talc, mica, or other similar substance to prevent the inner tubing adhering thereto when in use. In the rebuilding and repairing of tire casings, rubber or similar material is employed, and said repairing material is secured to the casing by means of a cement. In order that this cement may properly adhere to the casing and secure the repairing material in place, it is necessary that the powdered compound be entirely removed from the surface treated, and it is the primary object of this invention to provide a machine which will carry out the aforementioned cleaning operation.

It is a further object of the invention to provide a machine of this character which is automatic in its operation, the tire being automatically moved relatively to the cleaning element until the cleaning operation is carried out.

It is a still further object of the invention to provide a mechanism by means of which the brush in addition to its rotary cleaning motion may be given a vibratory motion to facilitate the removal of the residue of the cleaning operation.

With the above and other objects in view which will appear as the nature of the invention is better understood, reference is had to the accompanying drawings in which—

Figure 1 is a view partly in elevation and partly in section of a machine constructed in accordance with the present invention, the tire casing being broken away;

Fig. 2 is a sectional view taken on the line 2—2 of Fig. 1;

Figures 3, 4:
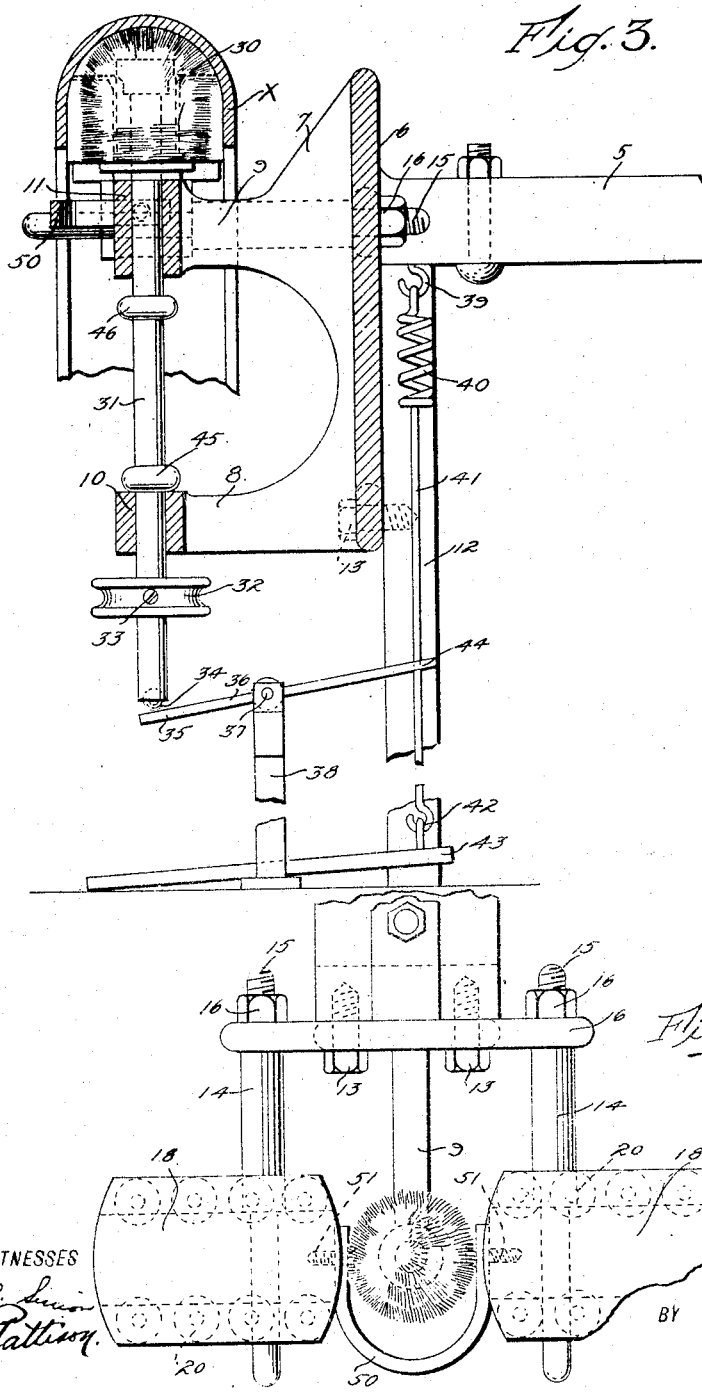
Fig. 3 is a sectional view taken on the line 3—3 of Fig. 1.
Fig. 4 is a detail top plan view of the casing-supporting element and the cleaning element and showing their relative positions.

Referring more particularly to the drawings, the reference character 5 designates an arm or bracket, one end of which is secured to a suitable support, not shown. The outer end of the arm 5 is formed with a plate 6 arranged at right angles to said arm, and projecting from the forward face of said plate is a web 7. This web 7 is formed with two spaced arms 8 and 9, the free outer end of each of which is formed with a bearing 10 and 11, respectively. Depending from the under face of the arm 5, is a supporting standard 12, and said standard 12 is secured to the plate 6 near its lower end by means of bolts or the like 13.

Projecting forwardly from opposite sides of the plate 6 are bolts 14, said bolts having their inner ends screw-threaded as indicated by the reference character 15, and engaging with the inner screw-threaded ends 15 are nuts 16, by means of which said bolts are secured to the plate 6. Mounted on the outer ends of the bolts 14, are tire-supporting members 17, which latter have their upper faces curved as designated by the reference character 18. The opposite sides of these tire-supporting members 17 are cut out to form channels 19, and mounted in said channels 19 are vertically disposed rollers 20. The rollers 20 are mounted on spindles 21 and are so positioned with respect to the tire-supporting elements 17, that as the tire casing is placed therein, the beads thereof will engage with the rollers 20, thus spreading the casing in order that the cleaning element may properly engage its entire inner surface to perform its function.

As shown in Figs. 1 and 2, the end rollers of one of the tire supporting members 17, are rigidly secured to spindles 22, and mounted on the lower end of said spindles are gears 23, which, as shown in Fig. 2, mesh with each other and serve to drive the spindles 22 and rollers positively secured thereto.

One of the spindles 22 is provided on its lower end with a bevel gear 24, and meshing with said bevel gear 24 is a bevel gear 25, which in turn is connected to a pulley 26, in such a manner as to rotate therewith. The bevel gear 25 and the pulley 26 are freely rotatable on a shaft 27, which in turn is mounted in the arms 28 of a bracket 29 depending from the under face of one of the tire-supporting elements 17. By this mechanism, it will be apparent that as the pulley 26 is rotated about the shaft 27, the bevel gear 24 will be driven through the medium of the bevel gear 25, this operation serving to drive the two end rollers 20 through the medium of their spindles 22 to which they are positively connected, and thus feed the tire casing relatively to the cleaning element by frictional contact of the beads of the tire casing with said rollers.

The reference character 30 designates the cleaning element which in the present instance is a brush so arranged as to conform to the inner contour of a tire casing of conventional form. This cleaning element 30 is secured to the upper end of a shaft 31, and said shaft is rotatably mounted in the bearings 10 and 11 heretofore mentioned. The shaft 31 is provided near its lower end, with a driving pulley 32, which is secured to the shaft by means of a set screw or other suitable key 33. Mounted in the lower end of the shaft is a roller 34, and said roller contacts with the end 35 of a lever 36, which is pivotally mounted between its ends as at 37, in brackets 38.

Secured to the under face of the arm 5, is a hook 39, and engaging said hook is a spring 40, to the lower end of which is connected a link 41. The lower end of this link 41 is connected, as at 42, to a foot treadle 43, as best seen in Fig. 3. This link 41 passes through the end 44 of the pivoted lever 36, and is connected thereto in such a manner that as the foot treadle 43 is depressed, the lever 36 will be rocked about its pivotal point 37, to reciprocate the vertical shaft 31 in the bearings 10 and 11.

The shaft 31 is provided with collars or the like 45 and 46, the collar 45 contacting with the upper face of the bearing 10 to limit the downward movement of the shaft, and the collar 46 contacting with the lower face of the bearing 11 to limit the upward movement of said shaft.

By the above construction, it will be apparent that as the foot treadle 43 is operated, the shaft 31, through the medium of the link 41 and the pivoted lever 36, is reciprocated vertically to impart a vibratory motion to the cleaning element 30.

Secured to the tire-supporting members 17 and projecting forwardly therefrom is a curved guard member 50, said guard being secured at its ends by means of bolts or the like 51.

The operation of the device is as follows:
The tire casing X is positioned on the supports 17, as shown in Figs. 1 and 3, and rotary motion is imparted to the vertical shaft 31 to rotate the cleaning element 30. Said cleaning element, owing to its contact with the inner surface of the tire casing, removes the talc or other composition therefrom, thoroughly cleaning the tire. In addition to the rotary motion given the cleaning element, a vibratory motion is imparted thereto as heretofore mentioned. As the brush of the cleaning element is rotated, the pulley 26 is likewise rotated, and through the medium of the bevel gears 24 and 25 and the pinions 23, the end rollers 20 are rotated, and through the medium of their contact with the beads of the tire casing, said tire casing is automatically fed to successively present its inner surface to the action of the cleaning element.

From the foregoing, it will be apparent that the present invention provides an apparatus, by means of which a very effective cleaning of the inner surface of a tire casing may be had. Furthermore, a cleaning of the exterior surface of the tire casing may likewise be obtained by the operator holding the tire casing in his hands and subjecting that portion which it is desired to clean to the action of the cleaning element.

Claims:
1. A device for operating upon the interior of tire casings comprising a cleaning element, and means for spreading and automatically subjecting portions of the tire successively to the action of the cleaning element.

2. A device of the character described comprising means for supporting and spreading a tire casing, means associated with the casing-supporting means for moving the casing relatively to the supporting means, and a cleaning element for engagement with the tire casing during its movement relative to said supporting means.

3. A device of the character described comprising a pair of spaced tire-supporting elements, a plurality of rollers mounted in each of said tire-supporting elements, and means for driving certain of said rollers to move the tire relatively to the supporting elements.

4. A device of the character described comprising a plurality of spaced tire-supporting elements, a plurality of rollers mounted on the opposite sides of each of said tire-supporting elements, a rotary cleaning element mounted between the tire-supporting elements, and means for driving two of said rollers to advance the tire relatively to the tire-supporting elements.

5. A device of the character described comprising a plurality of spaced tire-supporting elements and a cleaning element mounted in the space between said tire-supporting elements, means for imparting rotary motion to said cleaning element, and means for permitting of a continuous reciprocating motion of said cleaning element relative to the tire-supporting elements and the tire supported thereby.

HAROLD G. BALLOU.